United States Patent
Kim

(10) Patent No.: US 12,253,602 B2
(45) Date of Patent: Mar. 18, 2025

(54) METHOD AND DEVICE FOR TRACKING OBJECT USING LiDAR SENSOR, VEHICLE INCLUDING THE DEVICE, AND RECORDING MEDIUM STORING PROGRAM TO EXECUTE THE METHOD

(71) Applicants: Hyundai Motor Company, Seoul (KR); Kia Motors Corporation, Seoul (KR)

(72) Inventor: Hyun Ju Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 987 days.

(21) Appl. No.: 17/180,243

(22) Filed: Feb. 19, 2021

(65) Prior Publication Data
US 2022/0099838 A1    Mar. 31, 2022

(30) Foreign Application Priority Data
Sep. 25, 2020  (KR) .................. 10-2020-0124752

(51) Int. Cl.
*G01S 17/50* (2006.01)
*G01S 17/04* (2020.01)
*G01S 17/89* (2020.01)
(52) U.S. Cl.
CPC .............. *G01S 17/50* (2013.01); *G01S 17/04* (2020.01); *G01S 17/89* (2013.01)

(58) Field of Classification Search
CPC ............. G06T 7/11; G01S 17/89; G01S 17/04
See application file for complete search history.

(56) References Cited

U.S. PATENT DOCUMENTS

| 10,539,665 B1 * | 1/2020 | Danziger | .................. G06T 5/80 |
| 2021/0056712 A1 * | 2/2021 | Daudelin | ............... G06V 20/58 |

OTHER PUBLICATIONS

J.-K. Huang and J. W. Grizzle, "Improvements to Target-Based 3D LiDAR to Camera Calibration," in IEEE Access, vol. 8, pp. 134101-134110, 2020, doi: 10.1109/ACCESS.2020.3010734 (Year: 2020).*

* cited by examiner

*Primary Examiner* — Luke D Ratcliffe
*Assistant Examiner* — Clara G Chilton
(74) *Attorney, Agent, or Firm* — SLATER MATSIL, LLP

(57) ABSTRACT

A method of tracking an object using a LiDAR sensor includes clustering LiDAR data that includes a plurality of points for an object detected by the LiDAR sensor, generating information on a plurality of segment boxes for each channel using a result of the clustering, and selecting, among the segment boxes, an associated segment box at a current time for a target object that is being tracked. The selecting includes calculating a correlation index between a current representative point and each of a tracking representative point and a previous representative point of each of the segment boxes at the current time, selecting candidate segment boxes for the associated segment box using the correlation index, and selecting the associated segment box at the current time.

13 Claims, 14 Drawing Sheets

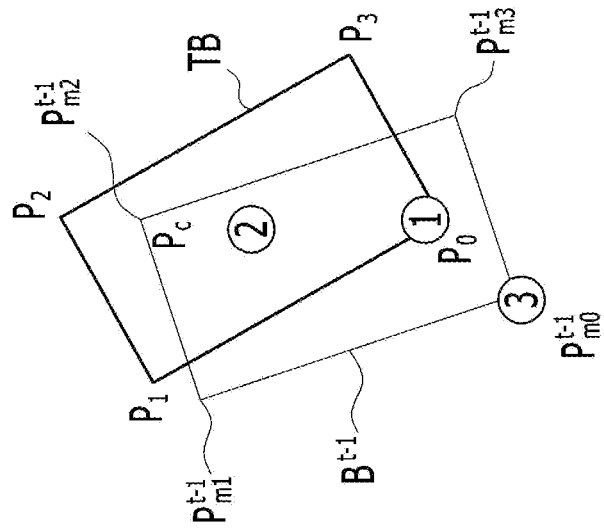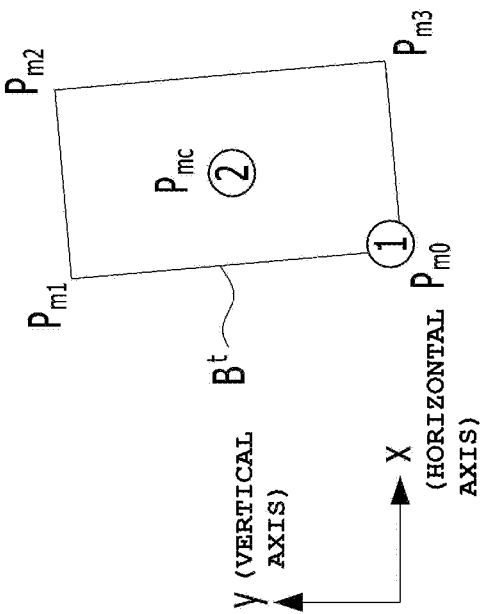

METHOD AND DEVICE FOR TRACKING OBJECT USING LiDAR SENSOR, VEHICLE INCLUDING THE DEVICE, AND RECORDING MEDIUM STORING PROGRAM TO EXECUTE THE METHOD

CROSS-REFERENCE TO RELATED APPLICATIONS

This application claims priority Korean Patent Application No. 10-2020-0124752, filed on Sep. 25, 2020, which application is hereby incorporated herein by reference.

TECHNICAL FIELD

Embodiments relate to a method and device for tracking an object using a LiDAR sensor, a vehicle including the device, and a recording medium storing a program to execute the method.

BACKGROUND

A highway driving pilot (HDP) system of a vehicle is a system that maintains the speed of the vehicle according to conditions set by a driver based on information set by the driver about the speed of the vehicle and the distance to a preceding vehicle traveling in the lane of the vehicle without operation of an accelerator pedal or a brake pedal by the driver.

For example, information on a target vehicle may be obtained using a light detection and ranging (LiDAR) sensor, and an HDP function may be performed using the obtained information. However, if the information on the target vehicle obtained using the LiDAR sensor is incorrect, the HDP function may be erroneously performed, leading to deterioration in the reliability of the vehicle.

SUMMARY

Accordingly, embodiments are directed to a method and device for tracking an object using a LiDAR sensor, a vehicle including the device, and a recording medium storing a program to execute the method that substantially obviate one or more problems due to limitations and disadvantages of the related art.

Embodiments may provide a method and device for tracking an object using a LiDAR sensor having stable tracking performance, a vehicle including the device, and a recording medium storing a program to execute the method.

However, the objects to be accomplished by the embodiments are not limited to the above-mentioned object, and other objects not mentioned herein will be clearly understood by those skilled in the art from the following description.

A method of tracking an object using a LiDAR sensor according to an embodiment may include clustering LiDAR data composed of a plurality of points for an object obtained by the LiDAR sensor, generating information on a plurality of segment boxes for each channel using the result of the clustering, and selecting, among the plurality of segment boxes, an associated segment box at the current time t for a target object that is being tracked. The selecting may include obtaining a correlation index between a current representative point and each of a tracking representative point and a previous representative point of each of the plurality of segment boxes at the current time t, selecting, among the plurality of segment boxes, candidate segment boxes for the associated segment box using the correlation index, and selecting, among the selected candidate segment boxes, the associated segment box at the current time t. The tracking representative point may correspond to a representative point of a tracking box of the target object at the current time t, estimated using history information. The previous representative point may correspond to a representative point of a segment box selected as the associated segment box at a previous time t−1.

For example, the current representative point may include a first peripheral representative point located at a corner of the segment box and a first central representative point located at the center of the segment box. The tracking representative point may include a second peripheral representative point located at a corner of the tracking box and a second central representative point located at the center of the tracking box. The previous representative point may include a third peripheral representative point located at a periphery of the associated segment box selected at the previous time.

For example, the correlation index may include a first correlation index between the first peripheral representative point and the second peripheral representative point, a second correlation index between the first central representative point and the second central representative point, and a third correlation index between the first peripheral representative point and the third peripheral representative point.

For example, the first, second and third correlation indices may be obtained as follows.

$$\gamma_1 = \frac{(x_{mo} - x_o)^2}{(\sigma_{xm}^2 + \sigma_x^2)} + \frac{(y_{mo} - y_o)^2}{(\sigma_{ym}^2 + \sigma_y^2)}$$

$$\gamma_2 = \frac{(x_{mc} - x_c)^2}{(\sigma_{xmc}^2 + \sigma_x^2)} + \frac{(y_{mc} - y_c)^2}{(\sigma_{ymc}^2 + \sigma_y^2)}$$

$$\gamma_3 = \frac{(x_{mo}^t - x_{mo}^{t-1})^2}{(\sigma_{xm}^2 + \sigma_k^2)} + \frac{(y_{mo}^t - y_{mo}^{t-1})^2}{(\sigma_{ym}^2 + \sigma_y^2)}$$

Here, $\gamma_1$ represents the first correlation index, $\gamma_2$ represents the second correlation index, $\gamma_3$ represents the third correlation index, each of $x_{m0}$ and $x^t_{m0}$ represents the horizontal-axis coordinate of the first peripheral representative point, each of $y_{m0}$ and $y^t_{m0}$ represents the vertical-axis coordinate of the first peripheral representative point, $x_0$ represents the horizontal-axis coordinate of the second peripheral representative point, $y_0$ represents the vertical-axis coordinate of the second peripheral representative point, $\sigma^2_{xm}$ represents the horizontal-axis variance value of the first peripheral representative point, $\sigma^2_{ym}$ represents the vertical-axis variance value of the first peripheral representative point, $\sigma^2_x$ represents the horizontal-axis variance value of the second peripheral representative point, $\sigma^2_y$ represents the vertical-axis variance value of the second peripheral representative point, $x_{mc}$ represents the horizontal-axis coordinate of the first central representative point, $y_{mc}$ represents the vertical-axis coordinate of the first central representative point, $\sigma^2_{xmc}$ represents the horizontal-axis variance value of the first central representative point, $\sigma^2_{ymc}$ represents the vertical-axis variance value of the first central representative point, $x_c$ represents the horizontal-axis coordinate of the second central representative point, $y_c$ represents the vertical-axis coordinate of the second central representative point, $x^{t-1}_{m0}$ represents the horizontal-axis coordinate of the third peripheral representative point, and $y^{t-1}_{m0}$ represents the vertical-axis coordinate of the third peripheral representative point.

For example, in the selecting the candidate segment boxes, one of the plurality of segment boxes that satisfies at least one of three conditions below may be selected as a candidate segment box for the associated segment box.

$$\gamma_1 < C1$$

$$\gamma_2 < C2$$

$$\gamma_3 < C3$$

Here, C1, C2 and C3 represent preset critical indices.

For example, one of the plurality of segment boxes that does not satisfy the three conditions but overlaps the tracking box may be selected as a candidate segment box.

For example, the selecting the associated segment box may include assigning a first score to distance suitability of each of the candidate segment boxes, assigning a second score to reliability suitability of each of the candidate segment boxes, assigning a third score to correlation between each of the candidate segment boxes and the associated segment box selected at the previous time, summing the first to third scores assigned to each of the candidate segment boxes to calculate a final score, and selecting, among the candidate segment boxes, a candidate segment box that has the highest final score as the associated segment box at the current time t.

For example, in the assigning the first score, the first score may be assigned to one of the candidate segment boxes in which the smallest one of the first to third correlation indices is equal to or less than a first threshold value.

For example, the assigning the second score may include obtaining a reliability level of each of the candidate segment boxes and assigning the second score to one of the candidate segment boxes that has a reliability level greater than a second threshold value.

For example, the obtaining the reliability level may include a shape reliability level determination step of obtaining a preset $2\text{-}1^{st}$ reliability level corresponding to the shape of the candidate segment box, an attribute reliability level determination step of obtaining a preset $2\text{-}2^{nd}$ reliability level corresponding to at least one of the ratio of the number of points included in the candidate segment box to the size of the candidate segment box or the degree of dispersion of points included in the candidate segment box, a geometric reliability level determination step of obtaining a preset $2\text{-}3^{rd}$ reliability level corresponding to the position of the candidate segment box and the distance from a reference point to the candidate segment box, and summing the preset $2\text{-}1^{st}$, $2\text{-}2^{nd}$, and $2\text{-}3^{rd}$ reliability levels to determine the reliability level to be compared with the second threshold value.

For example, in the assigning the third score, the third score may be assigned in proportion to the ratio of an area of each candidate segment box that overlaps the associated segment box selected at the previous time to the entire area of each candidate segment box.

For example, the method may further include determining whether the associated segment box selected at the current time t is present, upon determining that the associated segment box is present, updating the history information of a channel in which the associated segment box is included, and upon determining that the associated segment box is not present, deleting the history information of a channel in which the associated segment box is not present.

A device for tracking an object using a LiDAR sensor according to another embodiment may include a clustering unit configured to group LiDAR data composed of a plurality of points for an object obtained by the LiDAR sensor, a shape analysis unit configured to generate information on a plurality of segment boxes for each channel using the result of clustering, and an object-tracking unit configured to select, among the plurality of segment boxes, an associated segment box at the current time t for a target object that is being tracked. The object-tracking unit may include a storage unit configured to store history information for each channel, a correlation index calculation unit configured to calculate a correlation index between a current representative point and each of a tracking representative point and a previous representative point of each of the plurality of segment boxes at the current time t, a candidate selection unit configured to select, among the plurality of segment boxes, candidate segment boxes for the associated segment box using the correlation index, and a final selection unit configured to select, among the selected candidate segment boxes, the associated segment box at the current time t. The tracking representative point may correspond to a representative point of a tracking box of the target object at the current time t, estimated using the history information. The previous representative point may correspond to a representative point of a segment box selected as the associated segment box at a previous time t−1.

For example, the correlation index calculation unit may include a first index calculation unit configured to calculate a first correlation index between a first peripheral representative point and a second peripheral representative point, a second index calculation unit configured to calculate a second correlation index between a first central representative point and a second central representative point, and a third index calculation unit configured to calculate a third correlation index between the first peripheral representative point and a third peripheral representative point. The current representative point may include the first peripheral representative point located at a corner of the segment box and the first central representative point located at the center of the segment box. The tracking representative point may include the second peripheral representative point located at a corner of the tracking box and the second central representative point located at the center of the tracking box. The previous representative point may include the third peripheral representative point located at a periphery of the associated segment box selected at the previous time.

For example, the candidate selection unit may include a first comparison unit configured to compare the first correlation index for each of the plurality of segment boxes with a first critical index, a second comparison unit configured to compare the second correlation index for each of the plurality of segment boxes with a second critical index, a third comparison unit configured to compare the third correlation index for each of the plurality of segment boxes with a third critical index, and a box selection unit configured to select a candidate segment box for the associated segment box in response to the results of the comparison by the first to third comparison units.

For example, the candidate selection unit may further include an overlap determination unit configured to determine whether one of the plurality of segment boxes that has not been selected as the candidate segment box overlaps the tracking box using the correlation index in response to a control signal. The box selection unit may generate the control signal in response to the results of the comparison by the first to third comparison units, and may select the candidate segment box in response to the result of the determination by the overlap determination unit.

For example, the final selection unit may include a score assignment unit configured to assign a first score to distance suitability of each of the candidate segment boxes, to assign a second score to reliability suitability of each of the candidate segment boxes, and to assign a third score to correlation between each of the candidate segment boxes and the associated segment box selected at the previous time, a score calculation unit configured to sum the first to third scores assigned to each of the candidate segment boxes to calculate a final score, and a score comparison unit configured to select one of the candidate segment boxes that has the highest final score as the associated segment box at the current time t.

A vehicle according to still another embodiment may include a LiDAR sensor and a device for tracking an object using the LiDAR sensor.

According to still another embodiment, a recording medium in which a program for executing a method of tracking an object using a LiDAR sensor is recorded may store a program to implement a clustering function of grouping LiDAR data composed of a plurality of points for an object obtained by the LiDAR sensor, a function of generating information on a plurality of segment boxes for each channel using the result of clustering, and a function of selecting, among the plurality of segment boxes, an associated segment box at the current time t for a target object that is being tracked. The function of selecting may include a function of calculating a correlation index between a current representative point and each of a tracking representative point and a previous representative point of each of the plurality of segment boxes at the current time t, a function of selecting, among the plurality of segment boxes, candidates for the associated segment box using the correlation index, and a function of selecting, among the selected candidates, the associated segment box at the current time t. The tracking representative point may correspond to a representative point of a tracking box of the target object at the current time t, estimated using history information. The previous representative point may correspond to a representative point of a segment box selected as the associated segment box at a previous time t−1.

BRIEF DESCRIPTION OF THE DRAWINGS

Arrangements and embodiments may be described in detail with reference to the following drawings in which like reference numerals refer to like elements and wherein:

FIGS. 6A and 6B are diagrams for explaining the concepts of a current representative point, a tracking representative point, and a previous representative point;

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a method and device 600 for tracking an object using a light detection and ranging (LiDAR) sensor 500 and a vehicle 1000 using the same according to embodiments will be described with reference to the accompanying drawings. For convenience of description, the method and device 600 for tracking an object using the LiDAR sensor 500 and the vehicle 1000 using the same will be described using the Cartesian coordinate system (x-axis, y-axis, z-axis). However, the embodiments are not limited thereto. In the Cartesian coordinate system, the x-axis, the y-axis, and the z-axis are perpendicular to each other, but the embodiments are not limited thereto. That is, the x-axis, the y-axis, and the z-axis may intersect each other obliquely.

Figure 1:
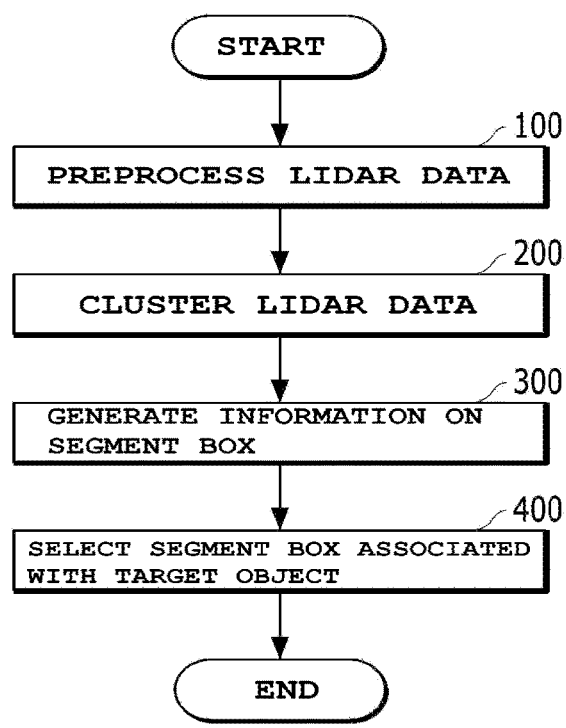
FIG. 1 is a flowchart for explaining an object-tracking method using a LiDAR sensor according to an embodiment.
Figure 2:
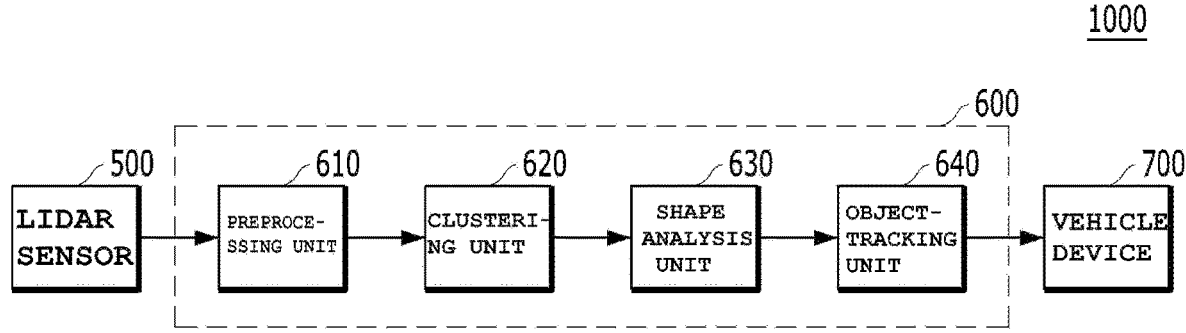
FIG. 2 is a block diagram for explaining an object-tracking device using a LiDAR sensor according to an embodiment.

FIG. 1 is a flowchart for explaining an object-tracking method using the LiDAR sensor 500 according to an embodiment, and FIG. 2 is a block diagram for explaining an object-tracking device 600 using the LiDAR sensor 500 according to an embodiment.

For convenience of description, the object-tracking method shown in FIG. 1 will be described as being performed by the object-tracking device 600 shown in FIG. 2, but the embodiments are not limited thereto. That is, according to another embodiment, the object-tracking method shown in FIG. 1 may be performed by an object-tracking device having a configuration different from that of the object-tracking device 600 shown in FIG. 2. In addition, the object-tracking device 600 shown in FIG. 2 will be described as performing the object-tracking method shown in FIG. 1, but the embodiments are not limited thereto. That is, according to another embodiment, the object-tracking device 600 shown in FIG. 2 may perform an object-tracking method having processes different from those of the object-tracking method shown in FIG. 1.

The object-tracking device 600 using the LiDAR sensor 500 shown in FIG. 2 may include a clustering unit 620, a shape analysis unit (or a segment unit) 630, and an object-tracking unit (a tracking unit, a tracking and classification unit, or an object detection unit) 640. In addition, the object-tracking device 600 may further include a preprocessing unit 610. In addition, the vehicle 1000 according to an embodiment may include the LiDAR sensor 500, the object-tracking device 600, and a vehicle device 700.

The LiDAR sensor 500 may radiate a single circular laser pulse having a wavelength of, for example, 905 nm to 1550 nm to an object present within a measurement range, and may measure the time taken for the laser pulse reflected from the object to return, thereby detecting information on the object, for example, the distance from the LiDAR sensor 500 to the object, the orientation of the object, the speed of the object, the temperature of the object, the material distribution of the object, and the concentration characteristics of the object. Here, the object may be, for example, another vehicle, a person, or an object present outside the vehicle 1000 in which the LiDAR sensor 500 is mounted (hereinafter referred to as the "host vehicle"). However, the embodiments are not limited to any specific type of object.

The LiDAR sensor 500 may include a transmitter (not shown), which transmits a laser pulse, and a receiver (not shown), which receives the laser reflected from the surface of an object present within a detection range. The receiver has a predetermined field of view (FOV), which is a range that the LiDAR sensor 500 is capable of observing simultaneously without moving or rotating.

Since the LiDAR sensor 500 exhibits higher detection accuracy in vertical/horizontal directions than a radio detecting and ranging (RaDAR) sensor, the LiDAR sensor 500 is capable of providing accurate vertical/horizontal-directional position information, and is thus advantageously used for obstacle detection and vehicle position recognition. As examples of the LiDAR sensor 500, there are a two-dimensional (2D) LiDAR sensor and a three-dimensional (3D) LiDAR sensor. The 2D LiDAR sensor is configured to be tiltable or rotatable, and is used to obtain LiDAR data including 3D information through tilting or rotation. The 3D LiDAR sensor is capable of obtaining a plurality of 3D points and thus of predicting the height information of an obstacle, thus helping in accurate and precise detection and tracking of an object. The 3D LiDAR sensor may be composed of multiple 2D LiDAR sensor layers, and may generate LiDAR data including 3D information.

The LiDAR sensor 500 outputs point cloud data (hereinafter referred to as "LiDAR data") composed of a plurality of points for a single object.

The method and device 600 for tracking an object according to the embodiments are not limited to any specific shape, position, or type of LiDAR sensor 500.

The object-tracking device 600 may receive LiDAR data, and may use the same to determine the presence or absence of an object, to start, continue, or stop tracking an object, to update, store, or delete information on an object, and to classify the type of object.

The preprocessing unit 610 may preprocess LiDAR data (step 100). To this end, the preprocessing unit 610 may perform calibration to match the coordinates between the LiDAR sensor 500 and the vehicle 1000. That is, the preprocessing unit 610 may convert LiDAR data into data suitable for the reference coordinate system according to the positional angle at which the LiDAR sensor 500 is mounted to the vehicle 1000. In addition, the preprocessing unit 610 may perform filtering to remove points having low intensity or reflectance using intensity or confidence information of the LiDAR data.

In addition, the preprocessing unit 610 may remove data reflected by the body of the host vehicle 1000. That is, since there is a region that is shielded by the body of the host vehicle 1000 according to the mounting position and the field of view of the LiDAR sensor 500, the preprocessing unit 610 may remove data reflected by the body of the host vehicle 1000 using the reference coordinate system.

In the object-tracking method according to the embodiment, step 100 may be omitted. In this case, the preprocessing unit 610 may be omitted from the object-tracking device 600 according to the embodiment.

After step 100, the clustering unit 620 groups the point cloud data, which is the LiDAR data consisting of a plurality of points for the object obtained through the LiDAR sensor 500, into meaningful units according to a predetermined criterion (step 200). In the case in which step 100, which is the preprocessing step, and the preprocessing unit 610 are not omitted, the clustering unit 620 may group the LiDAR data preprocessed by the preprocessing unit 610. For example, the clustering unit 620 may group the point cloud data by applying vehicle modeling or guardrail modeling thereto to perform clustering to determine the external appearance of the object. The result detected by the LiDAR sensor 500 shows a plurality of points, each of which has only position information. Accordingly, the clustering unit 620 serves to group the plurality of points detected by the LiDAR sensor 500 into meaningful shape units.

As examples of the clustering unit 620, there are a 2D clustering unit and a 3D clustering unit. The 2D clustering unit is a unit that performs clustering in units of points or a specific structure by projecting data onto the X-Y plane without considering height information. The 3D clustering unit is a unit that performs clustering in the X-Y-Z plane in consideration of height information Z.

After step 200, the shape analysis unit 630 generates information on a plurality of segment boxes for each channel using the result of clustering from the clustering unit 620 (step 300). Here, the segment box may be the result of converting the result of clustering into a geometric box shape. In addition, the information on the segment box may be at least one of the width, length, position, or direction (or heading) of the segment box. The channel will be described later.

The following description of step 400 according to the embodiment is not limited to the presence or absence of step 100 or to any specific method of performing the preprocessing process in step 100, the clustering process in step 200, or the process of generating segment box information in step 300. Similarly, the following description of the object-tracking unit 640 according to the embodiment is not limited to the presence or absence of the preprocessing unit 610 or to any specific type of operation performed by the preprocessing unit 610, the clustering unit 620, or the shape analysis unit 630. That is, step 400 and the object-tracking unit 640 according to the embodiments may also be applied when the preprocessing unit 610 is omitted (i.e. when step 100 is omitted), when the preprocessing unit 610 performing step 100 processes LiDAR data in a manner different from that described above, when the clustering unit 620 performing step 200 clusters LiDAR data in a manner different from that described above, or when the shape analysis unit 630 performing step 300 generates segment box information in a manner different from that described above.

After step 300, the object-tracking unit 640 selects a segment box in association with the object that is being tracked (hereinafter referred to as a "target object") at the current time t (a final segment box or an associated segment box), among a plurality of segment boxes for each channel (step 400). A plurality of segment boxes may be obtained with respect to the same object depending on the visibility of the LiDAR sensor 500 and the shape of the object. Here, the term "association" is a process of selecting a segment box that is to be used to maintain tracking of a target object that is being currently tracked, among a plurality of pieces of segment box information. This association may be performed at a predetermined period.

In order to select an associated segment box from the respective plurality of segment boxes provided by each channel from the shape analysis unit 630, the object-tracking unit 640 may convert the information on each of the plurality of segment boxes into a predetermined format, and may select an associated segment box among the plurality of segment boxes having the converted format (or segment boxes of a meta object).

Figure 3A:
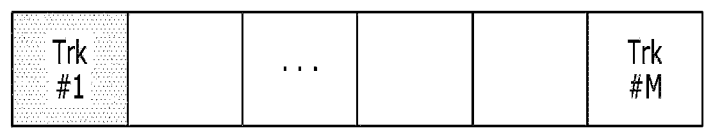
FIGS. 3A to 3C are diagrams for explaining the format of data processed by an object-tracking unit.
Figure 3B:
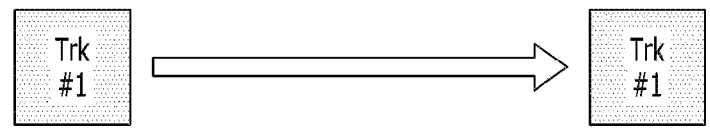
Figure 3C:
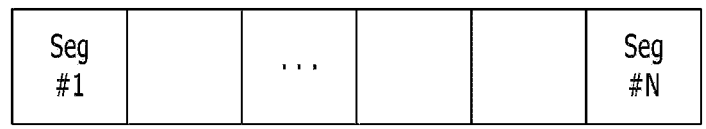

FIGS. 3A to 3C are diagrams for explaining the format of data (i.e. segment box information) processed by the object-tracking unit 640.

The method and device 600 for tracking an object according to the embodiments may track "M" target objects. Here, "M" is a positive integer of 1 or more. That is, the number M of target objects that may be tracked is the number M of tracks Trk shown in FIG. 3A. In addition, the unit in which history information on a unit target object is stored is referred to as a "channel", and the number of channels is the same as the number of tracks Trk. In this case, the history information may be information accumulated in each channel prior to the current time t with respect to the target object that is being tracked. The history information may include, for example, position information and speed information of the target object, measured periodically.

In addition, "N" segment boxes Seg #1 to Seg #N may be generated at the current time t with respect to the unit target object by the shape analysis unit 630, and may be provided to the object-tracking unit 640. Here, "N" is a positive integer of 1 or more, and may be the same as or different from "M". Hereinafter, "N" will be described as being a positive integer of 2 or more, but the following description may also apply to the configuration in which "N" is 1. That is, as shown in FIG. 3C, "N" segment boxes Seg #1 to Seg #N may be included in each Trk #m (1≤m≤M) of the first to $M^{th}$ channels Trk #1 to Trk #M.

The object-tracking device 600 selects an associated segment box in each channel at the current time t with respect to the target object that is being currently tracked, among the "N" segment boxes Seg #1 to Seg #N included in each of the first to $M^{th}$ channels (step 400).

Hereinafter, for convenience of description, the process of selecting an associated segment box in the $m^{th}$ channel Trk #m at the current time t with respect to the target object that is being currently tracked, among the "N" segment boxes Seg #1 to Seg #N included in the $m^{th}$ channel Trk #m shown in FIG. 3A, will be described. However, the following description may also apply to a process of selecting an associated segment box at the current time t with respect to the target object that is being currently tracked, among the "N" segment boxes Seg #1 to Seg #N included in each of the other channels.

Figure 4:
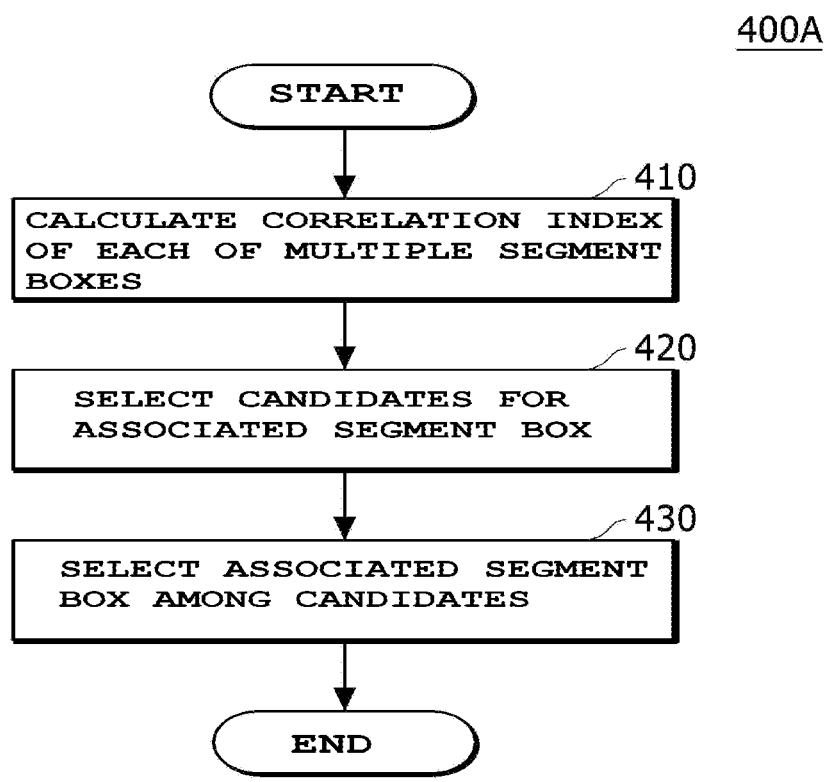
FIG. 4 is a flowchart for explaining an embodiment of step 400 shown in FIG. 1.
Figure 5:
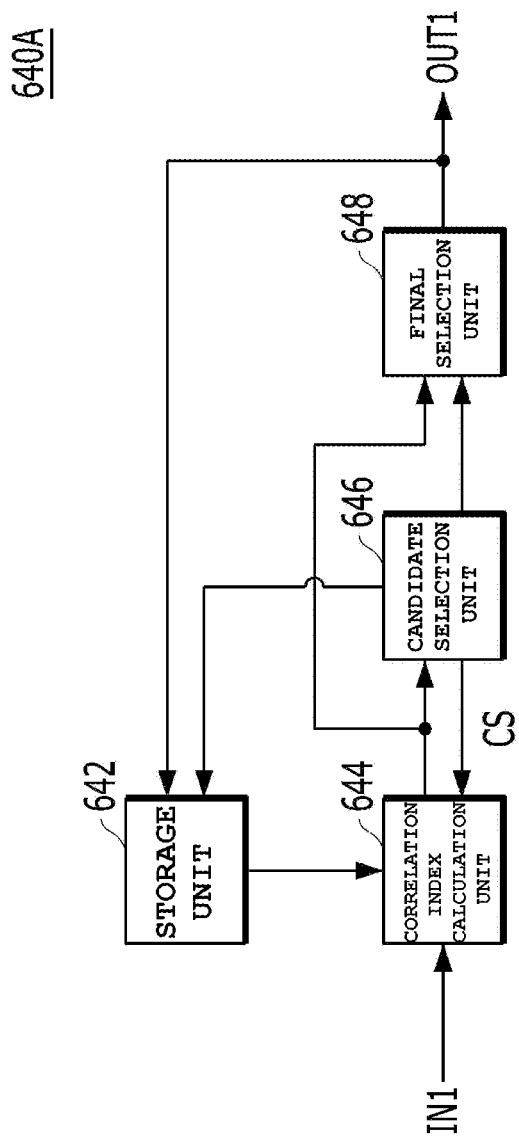
FIG. 5 is a block diagram for explaining an embodiment of the object-tracking unit shown in FIG. 2.

FIG. 4 is a flowchart for explaining an embodiment 400A of step 400 shown in FIG. 1, and FIG. 5 is a block diagram for explaining an embodiment 640A of the object-tracking unit 640 shown in FIG. 2.

For convenience of description, step 400A shown in FIG. 4 will be described as being performed by the object-tracking unit 640A shown in FIG. 5, but the embodiments are not limited thereto. That is, according to another embodiment, step 400A shown in FIG. 4 may be performed by an object-tracking unit having a configuration different from that of the object-tracking unit 640A shown in FIG. 5. In addition, the object-tracking unit 640A shown in FIG. 5 will be described as performing step 400A shown in FIG. 4, but the embodiments are not limited thereto. That is, according to another embodiment, the object-tracking unit 640A shown in FIG. 5 may perform a method having processes different from those of step 400A shown in FIG. 4.

The object-tracking unit 640A shown in FIG. 5 may include a storage unit 642, a correlation index calculation unit 644, a candidate selection unit 646, and a final selection unit 648.

The correlation index calculation unit 644 calculates the correlation index between the current representative point and each of the tracking representative point and the previous representative point of each of the multiple (i.e. "N") segment boxes Seg #1 to Seg #N included in the $m^{th}$ channel Trk #m at the current time t, and outputs the calculated correlation index to the candidate selection unit 646 (step 410). That is, the correlation index calculation unit 644 may calculate the correlation index between the current representative point and the tracking representative point and the correlation index between the current representative point and the previous representative point.

FIGS. 6A and 6B are diagrams for explaining the concepts of the current representative point, the tracking representative point, and the previous representative point.

FIG. 6A shows each $B^t$ of a plurality of segment boxes at the current time t, and FIG. 6B shows an associated segment box $B^{t-1}$ selected at a time t−1 prior to the current time t. In addition, FIG. 6B shows a tracking box TB of the target object estimated using history information at the current time t. For example, a tracking box TB may be generated by estimating tracking information, such as the current position, shape, and speed of the target object that is being tracked, using history information.

The storage unit 642 may store the history information for the respective channels Trk #1 to Trk #M shown in FIG. 3A.

In order to select an associated segment box for the target object at the current time t, the selecting of the representative point of each of the boxes $B^t$, $B^{t-1}$ and TB is very important to accurately perform "association". The reason for this is that the selecting of an associated segment box is accomplished through comparison between points.

The current representative point is a representative point of each $B^t$ of the plurality of segment boxes at the current time t, which is provided from the shape analysis unit 630 to the correlation index calculation unit 644 through an input terminal IN1. For example, the current representative point may include a representative point located at the periphery (or the edge) of the box $B^t$ (hereinafter referred to as a "first peripheral representative point") and a representative point located at the center of the box $B^t$ (hereinafter referred to as a "first central representative point"). For example, as shown in FIG. 6A, reference numerals $P_{m0}$, $P_{m1}$, $P_{m2}$ and $P_{m3}$ are assigned to the first peripheral representative points of each $B^t$ of the plurality of segment boxes at the current time t, in the clockwise direction from the lower left-hand corner thereof, and reference numeral $P_{mc}$ is assigned to the first central representative point located at the center thereof.

The tracking box is a box at which the associated segment box of the target object, which is being tracked, is estimated to be located at the current time t by reading out history information on the target object that is being tracked from the storage unit 642 and using the read-out history information. To this end, information on the tracking box TB may be stored in the storage unit 642, or may be generated in the correlation index calculation unit 644 using the history information stored in the storage unit 642.

The tracking representative point is a representative point of the tracking box TB at the current time t. For example, the tracking representative point may include a representative point located at the periphery (or the edge) of the tracking box TB (hereinafter referred to as a "second peripheral representative point") and a representative point located at the center of the tracking box TB (hereinafter referred to as a "second central representative point"). As shown in FIG. 6B, reference numerals $P_0$, $P_1$, $P_2$ and $P_3$ are assigned to the second peripheral representative points of the tracking box TB at the current time t, in the clockwise direction from the lower left-hand corner thereof, and reference numeral $P_c$ is assigned to the second central representative point located at the center thereof.

The previous representative point is a representative point of the segment box $B^{t-1}$ selected as the associated segment box at a time t–1 prior to the current time t. For example, the previous representative point may include a representative point located at the periphery of the associated segment box $B^{t-1}$ selected previously (hereinafter referred to as a "third peripheral representative point"). As shown in FIG. 6B, reference numerals $P^{t-1}_{m0}$, $P^{t-1}_{m1}$, $P^{t-1}_{m2}$ and $P^{t-1}_{m3}$ are assigned to the third peripheral representative points of the segment box $B^{t-1}$ selected as the associated segment box at a time t–1 prior to the current time t, in the clockwise direction from the lower left-hand corner thereof.

Figure 7:
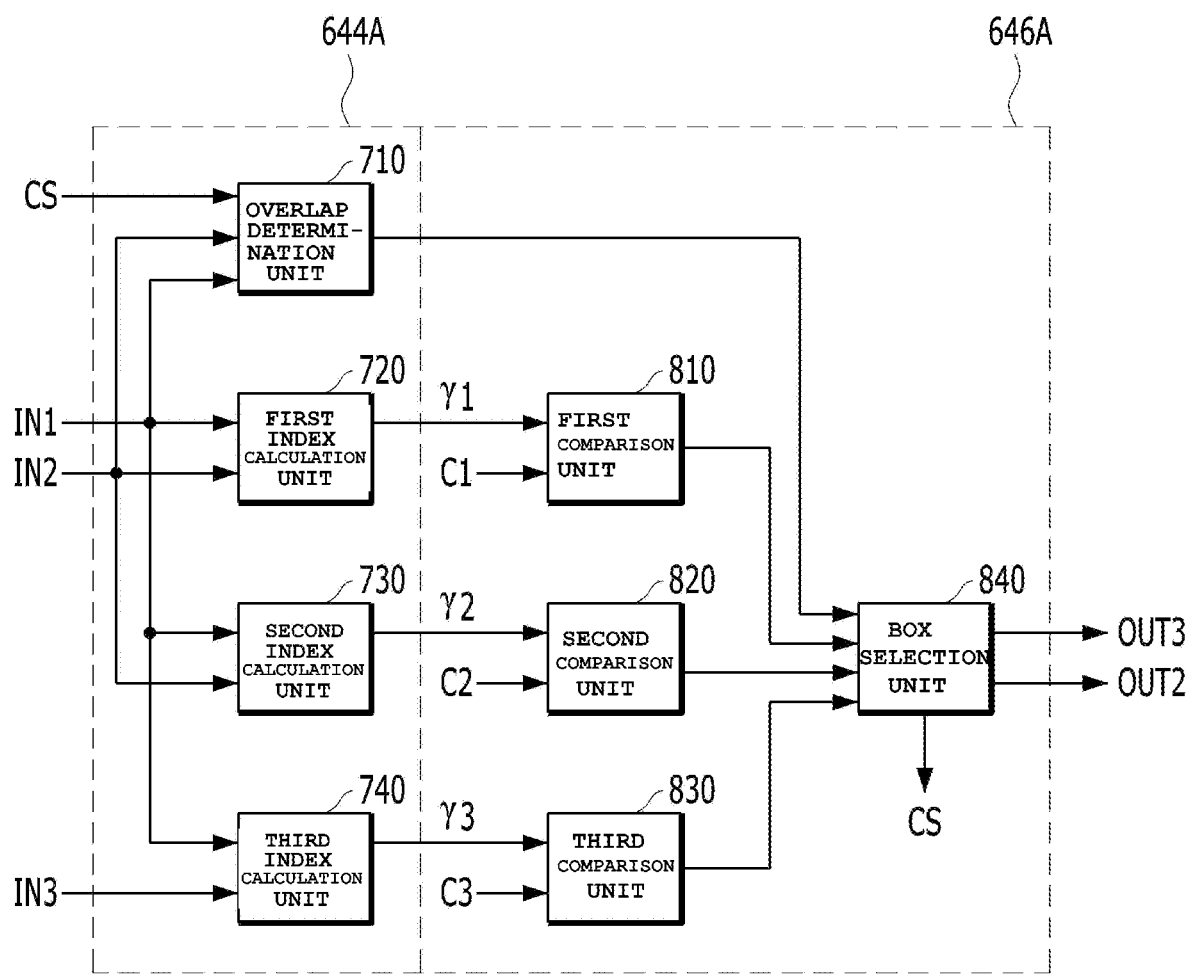
FIG. 7 is a block diagram of an embodiment of each of the correlation index calculation unit and the candidate selection unit shown in FIG. 5.

FIG. 7 is a block diagram of an embodiment 644A of the correlation index calculation unit 644 and an embodiment 646A of the candidate selection unit 646 shown in FIG. 5.

The correlation index calculation unit 644A may include first, second and third index calculation units 720, 730 and 740. In addition, the correlation index calculation unit 644A may further include an overlap determination unit 710.

The first index calculation unit 720 may calculate a first correlation index between the first peripheral representative point and the second peripheral representative point of the segment box $B^t$ at the current time t, which is output from the shape analysis unit 630 and is provided thereto through the input terminal IN1, for example, using Equation 1 below, and may output the calculated first correlation index to the candidate selection unit 646 or 646A.

$$\gamma_1 = \frac{(x_{mo} - x_o)^2}{(\sigma^2_{xm} + \sigma^2_x)} + \frac{(y_{mo} - y_o)^2}{(\sigma^2_{ym} + \sigma^2_y)} \quad \text{[Equation 1]}$$

Here, $\gamma_1$ represents the first correlation index, $x_{m0}$ represents the horizontal-axis coordinate of the first peripheral representative point, $y_{m0}$ represents the vertical-axis coordinate of the first peripheral representative point, $x_0$ represents the horizontal-axis coordinate of the second peripheral representative point, $y_0$ represents the vertical-axis coordinate of the second peripheral representative point, $\sigma^2_{xm}$ represents the horizontal-axis variance value of the first peripheral representative point, $\sigma^2_{ym}$ represents the vertical-axis variance value of the first peripheral representative point, $\sigma^2_x$ represents the horizontal-axis variance value of the second peripheral representative point, and $\sigma^2_y$ represents the vertical-axis variance value of the second peripheral representative point.

To this end, the first index calculation unit 720 may receive the second peripheral representative point from the storage unit 642 through the input terminal IN2, or may generate the same using the history information received from the storage unit 642 through the input terminal IN2.

The second index calculation unit 730 may calculate a second correlation index between the first central representative point $P_{mc}$ of the segment box $B^t$ at the current time t, which is output from the shape analysis unit 630 and is provided thereto through the input terminal IN1, and the second central representative point $P_c$ of the tracking box TB, for example, using Equation 2 below, and may output the calculated second correlation index to the candidate selection unit 646 or 646A.

$$\gamma_2 = \frac{(x_{mc} - x_c)^2}{(\sigma^2_{xmc} + \sigma^2_x)} + \frac{(y_{mc} - y_c)^2}{(\sigma^2_{ymc} + \sigma^2_y)} \quad \text{[Equation 2]}$$

Here, $\gamma_2$ represents the second correlation index, $x_{mc}$ represents the horizontal-axis coordinate of the first central representative point $P_{mc}$, $y_{mc}$ represents the vertical-axis coordinate of the first central representative point $P_{mc}$, $\sigma^2_{xmc}$ represents the horizontal-axis variance value of the first central representative point $P_{mc}$, $\sigma^2_{ymc}$ represents the vertical-axis variance value of the first central representative point $P_{mc}$, $x_c$ represents the horizontal-axis coordinate of the second central representative point, and $y_c$ represents the vertical-axis coordinate of the second central representative point.

To this end, the second index calculation unit 730 may receive the second central representative point from the storage unit 642 through the input terminal IN2, or may generate the same using the history information received from the storage unit 642 through the input terminal IN2.

The third index calculation unit 740 may calculate a third correlation index between the first peripheral representative point of the segment box $B^t$ at the current time t, which is output from the shape analysis unit 630 and is provided thereto through the input terminal IN1, and the third peripheral representative point, which is provided thereto from the storage unit 642 through the input terminal IN2, for example, using Equation 3 below, and may output the calculated third correlation index to the candidate selection unit 646 or 646A.

$$\gamma_3 = \frac{(x_{mo}^t - x_{mo}^{t-1})^2}{(\sigma_{xm}^2 + \sigma_K^2)} + \frac{(y_{mo}^t - y_{mo}^{t-1})^2}{(\sigma_{ym}^2 + \sigma_y^2)} \qquad \text{[Equation 3]}$$

Here, $\gamma_3$ represents the third correlation index, $x^t{}_{m0}$ represents the horizontal-axis coordinate of the first peripheral representative point at the current time t, and $y^t{}_{m0}$ represents the vertical-axis coordinate of the first peripheral representative point at the current time t. In Equations 1 and 2 set forth above, the coordinates $x_{m0}$, $y_{m0}$, $x_0$ and $y_0$, to which "t" is not added as a superscript, are coordinates at the current time t. That is, $x_{m0}$ in Equation 1 is the same as $x^t{}_{m0}$ in Equation 3, and $y_{m0}$ in Equation 1 is the same as $y^t{}_{m0}$ in Equation 3. However, in Equation 3, $x_{m0}$ is expressed as $x^t{}_{m0}$, and $y_{m0}$ is expressed as $y^t{}_{m0}$ in order to distinguish between the current time t and the previous time t−1. Furthermore, $x^{t-1}{}_{m0}$ represents the horizontal-axis coordinate of the third peripheral representative point, and $y^{t-1}{}_{m0}$ represents the vertical-axis coordinate of the third peripheral representative point.

After step 410, the candidate selection unit 646 or 646A may select candidates for the associated segment box among the plurality of segment boxes at the current time t using the correlation indices calculated in the correlation index calculation unit 644, i.e. the first to third correlation indices, and may output information on the selected candidate segment boxes to the final selection unit 648 (step 420).

Figure 8:
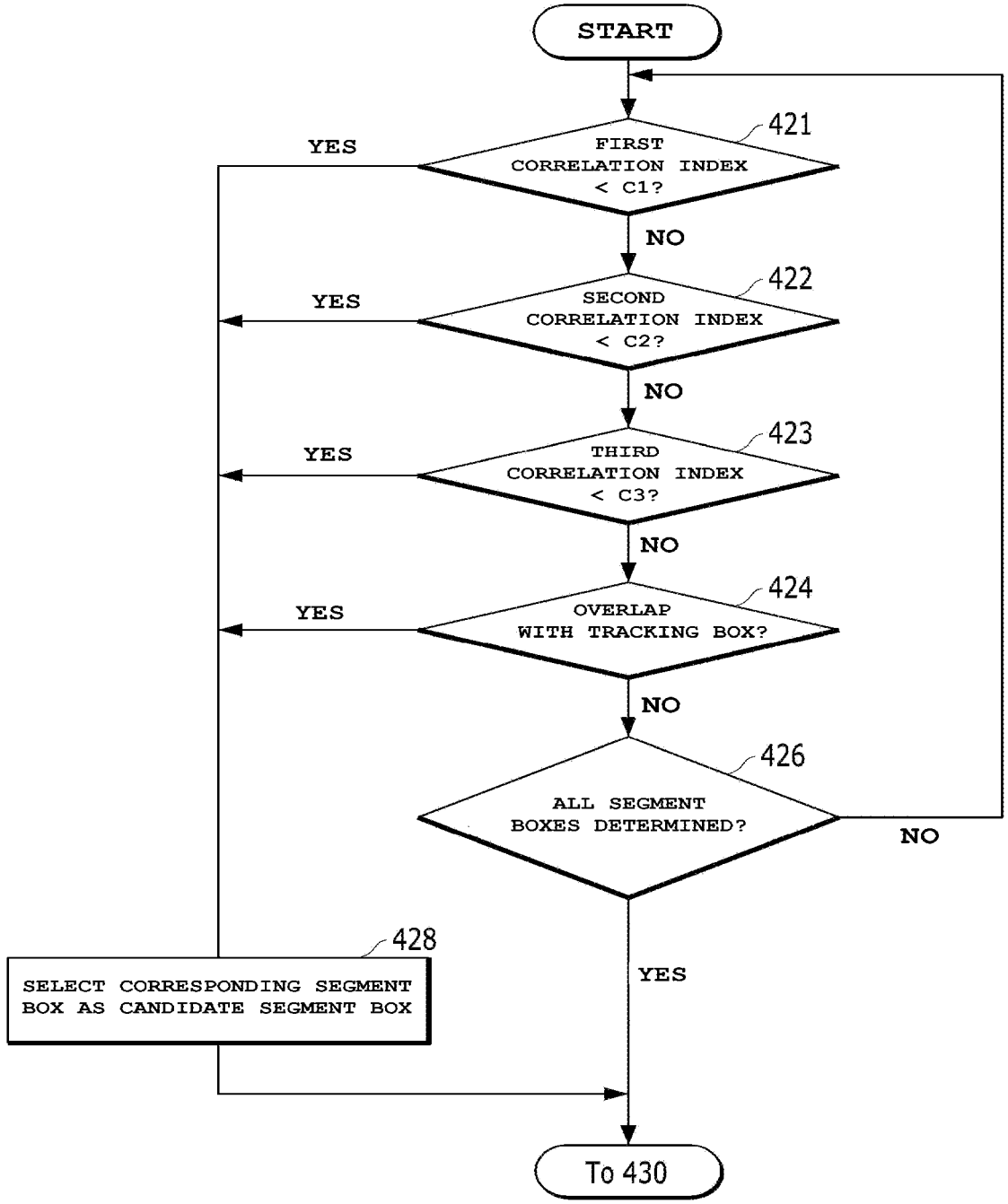
FIG. 8 is a flowchart of an embodiment of step 420 shown in FIG. 4.

FIG. 8 is a flowchart of an embodiment 420A of step 420 shown in FIG. 4.

For example, the candidate selection unit 646 or 646A may include first to third comparison units 810, 820 and 830 and a box selection unit 840, as shown in FIG. 7.

After step 410, the first comparison unit 810 compares the first correlation index $\gamma_1$ for each of the plurality of segment boxes at the current time t with a first critical index C1. That is, the first comparison unit 810 determines whether the first correlation index $\gamma_1$ is less than the first critical index C1, as expressed using Equation 4 below, and outputs the result of the determination to the box selection unit 840 (step 421).

$$\gamma_1 < C1 \qquad \text{[Equation 4]}$$

When the first correlation index $\gamma_1$ is determined to be less than the first critical index C1 based on the result of comparison by the first comparison unit 810, the box selection unit 840 selects, among the plurality of segment boxes at the current time t, a segment box, in which the first correlation index $\gamma_1$ is less than the first critical index C1, as a candidate segment box for the associated segment box, and outputs information on the selected candidate segment box to the final selection unit 648 (step 428).

In addition, the second comparison unit 820 compares the second correlation index $\gamma_2$ for each of the plurality of segment boxes at the current time t with a second critical index C2. That is, the second comparison unit 820 determines whether the second correlation index $\gamma_2$ is less than the second critical index C2, as expressed using Equation 5 below, and outputs the result of the determination to the box selection unit 840 (step 422).

$$\gamma_2 < C2 \qquad \text{[Equation 5]}$$

When the second correlation index $\gamma_2$ is determined to be less than the second critical index C2 based on the result of the comparison by the second comparison unit 820, the box selection unit 840 selects, among the plurality of segment boxes at the current time t, a segment box, in which the second correlation index $\gamma_2$ is less than the second critical index C2, as a candidate segment box for the associated segment box, and outputs information on the selected candidate segment box to the final selection unit 648 (step 428).

In addition, the third comparison unit 830 compares the third correlation index $\gamma_3$ for each of the plurality of segment boxes at the current time t with a third critical index C3. That is, the third comparison unit 830 determines whether the third correlation index $\gamma_3$ is less than the third critical index C3, as expressed using Equation 6 below, and outputs the result of the determination to the box selection unit 840 (step 423).

$$\gamma_3 < C3 \qquad \text{[Equation 6]}$$

In Equations 4, 5 and 6, the first, second and third critical indices C1, C2 and C3 may be set in advance.

When the third correlation index $\gamma_3$ is determined to be less than the third critical index C3 based on the result of the comparison by the third comparison unit 830, the box selection unit 840 selects, among the plurality of segment boxes at the current time t, a segment box, in which the third correlation index $\gamma_3$ is less than the third critical index C3, as a candidate segment box for the associated segment box, and outputs information on the selected candidate segment box to the final selection unit 648 (step 428).

Although it is illustrated in FIG. 8 that, when step 421 is not satisfied, the process goes to step 422, and when step 422 is not satisfied, the process goes to step 423, the embodiments are not limited thereto. That is, according to another embodiment, step 421, step 422, and step 423 may be performed in any order. According to still another embodiment, step 421, step 422, and step 423 may be performed simultaneously. In the case in which step 421, step 422, and step 423 are performed simultaneously, the candidate selection unit 646A shown in FIG. 7 corresponds to the embodiment of the candidate selection unit 646.

The box selection unit 840 may select a candidate segment box for the associated segment box at the current time t in response to the results of comparison by the first to third comparison units 810, 820 and 830. As such, after step 410, among a plurality of segment boxes, a segment box that satisfies at least one of the three conditions indicated in Equations 4, 5 and 6 may be selected as a candidate segment box for the associated segment box at the current time t.

In addition, the candidate selection unit 646A may further include an overlap determination unit 710, as shown in FIG. 7.

After steps 421, 422 and 423, it is determined whether, among a plurality of segment boxes, a segment box that does not satisfy any of the three conditions indicated in Equations 4, 5 and 6 overlaps the tracking box TB (step 424). If there is a segment box overlapping the tracking box TB, the segment box overlapping the tracking box TB may be selected as a candidate segment box (step 428).

Figure 9:
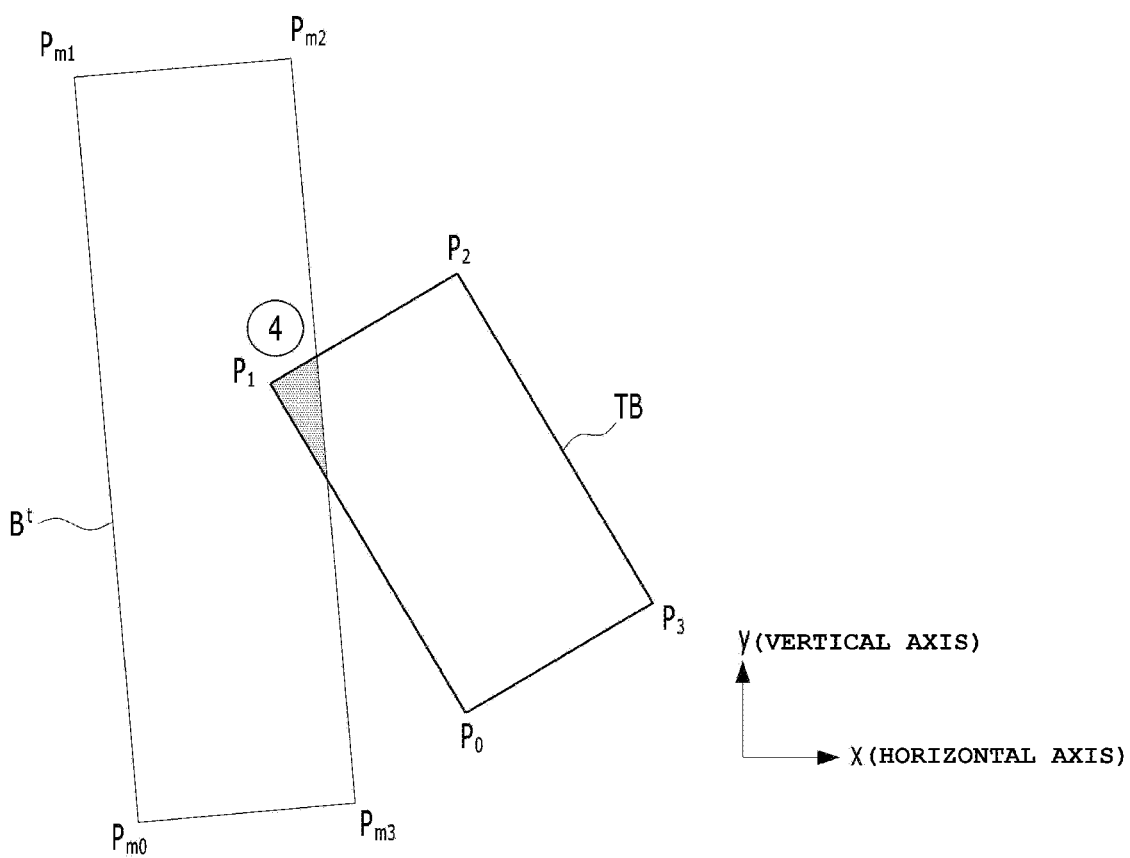
FIG. 9 is a diagram showing an example in which a segment box overlaps a tracking box at the current time.

FIG. 9 is a diagram showing an example in which the segment box B$^t$ overlaps the tracking box TB at the current time t.

Step 424 and step 428 may be performed by the box selection unit 840 and the overlap determination unit 710.

The box selection unit 840 may generate a control signal CS in response to the results of the comparison by the first to third comparison units 810, 820 and 830. When it is determined that there is a segment box that is not selected as the candidate segment box as a result of detecting the plurality of segment boxes using the correlation indices in response to the control signal CS, the overlap determination unit 710 may determine whether this segment box B$^t$ overlaps the tracking box TB, and may output the result of the determination to the box selection unit 840 (step 424). For example, as shown in FIG. 9, the segment box B$^t$ and the tracking box TB may overlap each other.

The box selection unit 840 may select a candidate segment box in response to the result of the determination by the overlap determination unit 710. That is, when the segment box B$^t$ is determined to overlap the tracking box TB based on the result of the determination by the overlap determination unit 710, the box selection unit 840 may select the segment box B$^t$ that overlaps the tracking box TB as a candidate segment box (step 428).

FIGS. 10A to 10I are diagrams showing various examples in which the segment box B$^t$ and the tracking box TB overlap each other.

Figure 10A:
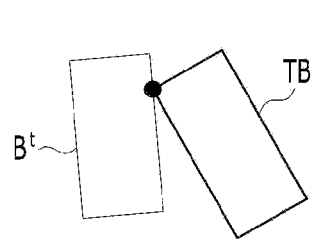
FIGS. 10A to 10I are diagrams showing various examples in which the segment box and the tracking box overlap each other.
Figure 10B:
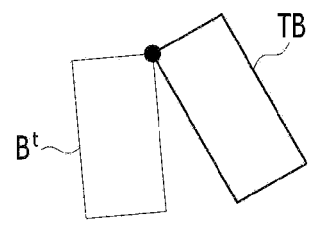
Figure 10C:
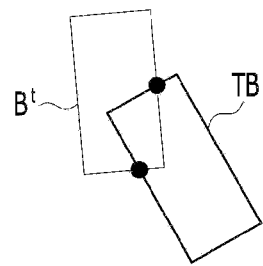
Figure 10D:
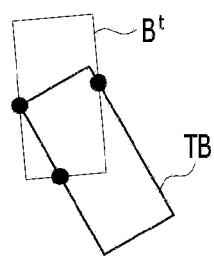
Figure 10E:
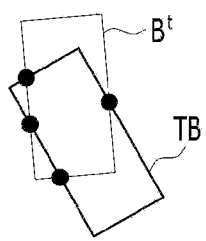
Figure 10F:
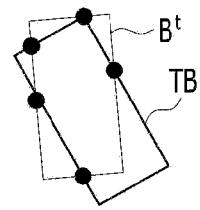
Figure 10G:
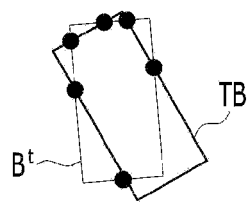
Figure 10H:
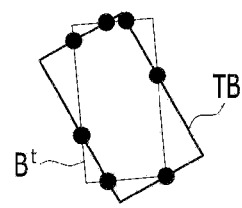
Figure 10I:
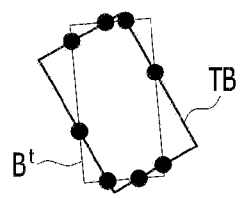

The segment box B$^t$ and the tracking box TB may overlap each other at one point, as illustrated in FIGS. 10A and 10B. The segment box B$^t$ and the tracking box TB may overlap each other at two points, as illustrated in FIG. 10C. The segment box B$^t$ and the tracking box TB may overlap each other at three points, as illustrated in FIG. 10D. The segment box B$^t$ and the tracking box TB may overlap each other at four points, as illustrated in FIG. 10E. The segment box B$^t$ and the tracking box TB may overlap each other at five points, as illustrated in FIG. 10F. The segment box B$^t$ and the tracking box TB may overlap each other at six points, as illustrated in FIG. 10G. The segment box B$^t$ and the tracking box TB may overlap each other at seven points, as illustrated in FIG. 10H. The segment box B$^t$ and the tracking box TB may overlap each other at eight points, as illustrated in FIG. 10I. Irrespective of the number of overlapping points, the segment box B$^t$ having a point overlapping the tracking box TB may be selected as a candidate segment box. Alternatively, according to another embodiment, only a segment box B$^t$ that overlaps the tracking box TB at a predetermined number of points or more may be selected as a candidate segment box.

The above-described first to third correlation indices are factors related to distance, and may be obtained through Euclidean distance calculation, or may be obtained through Mahalanobis distance calculation, as shown in Equations 1 to 3 above.

After steps 421, 422 and 423, when, among a plurality of segment boxes at the current time t, a segment box that does not satisfy any of the three conditions indicated in Equations 4, 5 and 6 does not overlap the tracking box, whether steps 421 to 424 have been performed on all of the first to N$^{th}$ segment boxes included in the m$^{th}$ channel may be determined (step 426).

If steps 421 to 424 have not been performed on all of the first to N$^{th}$ segment boxes included in the m$^{th}$ channel, steps 421 to 424 and 428 may be performed on the segment boxes that have not undergone steps 421 to 424, as described above.

For example, step 426 may be performed by the box selection unit 840. That is, whenever steps 421 to 424 are performed, the box selection unit 840 may count to determine which one of the "N" segment boxes undergoes steps 421 to 424.

Referring again to FIGS. 4 and 5, after step 420, the final selection unit 648 may select an associated segment box at the current time t, among the candidate segment boxes selected by the candidate selection unit 646, and may output information on the associated segment box selected thereby through an output terminal OUT1 (step 430).

Figure 11:
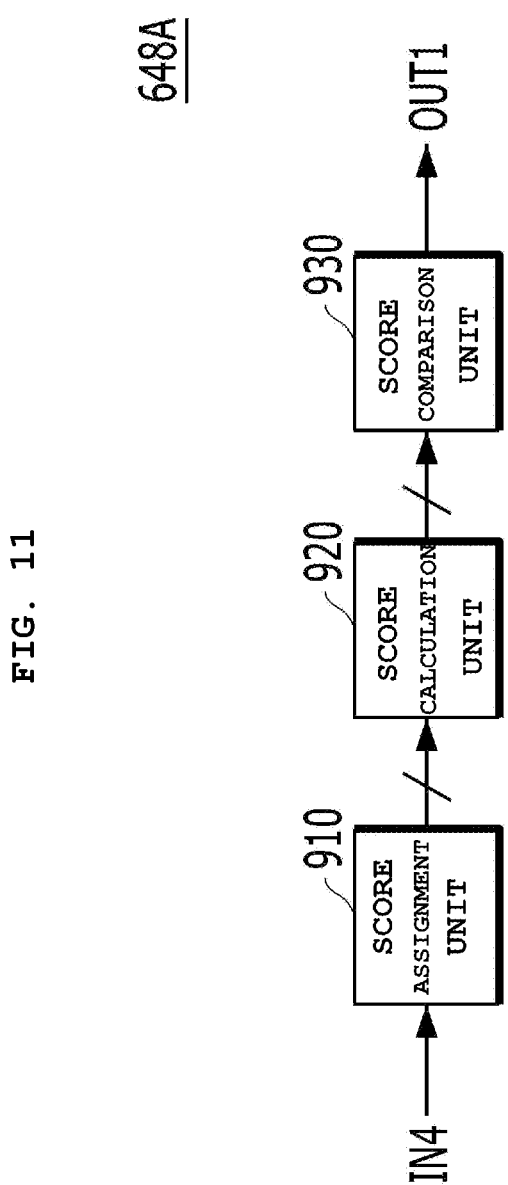
FIG. 11 is a block diagram of an embodiment of the final selection unit shown in FIG. 5.

FIG. 11 is a block diagram of an embodiment 648A of the final selection unit 648 shown in FIG. 5.

The final selection unit 648A shown in FIG. 11 may include a score assignment unit 910, a score calculation unit 920, and a score comparison unit 930.

The score assignment unit 910 may assign a first score SCORE1 to the distance suitability of each candidate segment box, may assign a second score SCORE2 to the reliability suitability of each candidate segment box, and may assign a third score SCORE3 to the correlation between each candidate segment box and the associated segment box B$^{t-1}$ selected previously. To this end, the score assignment unit 910 receives information on the candidate segment boxes from the candidate selection unit 646 or 646A through an input terminal IN4.

With regard to the distance suitability according to an embodiment, the smallest one of the first to third correlation indices of each candidate segment box may be compared with a first threshold value TV1 in order to determine the distance suitability. That is, among the candidate segment boxes, the first score SCORE1 may be assigned to a candidate segment box in which the smallest one of the first to third correlation indices is equal to or less than the first threshold value TV1.

With regard to the reliability suitability according to an embodiment, the reliability suitability may be determined using the reliability level of each candidate segment box. That is, among the candidate segment boxes, the second score SCORE2 may be assigned to a candidate segment box having a reliability level greater than a second threshold value TV2.

For example, the step of obtaining the reliability level of each candidate segment box may include a step of determining a shape reliability level, a step of determining an attribute reliability level, and a step of determining a geometric reliability level.

In the step of determining a shape reliability level, a 2-1$^{st}$ reliability level corresponding to the shape of the candidate segment box, e.g. the size thereof, may be obtained. In the step of determining an attribute reliability level, a 2-2$^{nd}$ reliability level corresponding to at least one of the ratio of the number of points included in the candidate segment box to the size of the candidate segment box or the degree of dispersion of points included in the candidate segment box may be obtained. In the step of determining a geometric reliability level, a 2-3$^{rd}$ reliability level corresponding to the position of the candidate segment box and the distance from a reference point to the candidate segment box may be obtained. For example, in the case in which the LiDAR sensor 500 and the object-tracking device 600 are mounted to the vehicle 1000, the reference point may be the position of the vehicle 1000. That is, the 2-3$^{rd}$ reliability level may be obtained based on the distance from the vehicle 1000 to the candidate segment box and on whether the candidate segment box is located at the boundary of the field of view of the LiDAR sensor 500. The 2-1$^{st}$, 2-2$^{nd}$ and 2-3$^{rd}$ reliability levels may be set in advance.

Thereafter, the 2-1$^{st}$, 2-2$^{nd}$ and 2-3$^{rd}$ reliability levels may be summed to determine a reliability level to be compared with the second threshold value TV2.

With regard to the correlation according to an embodiment, the correlation may be determined using the ratio of the area of each candidate segment box that overlaps the associated segment box selected previously to the entire area of each candidate segment box. Specifically, the third score may be assigned to the correlation in proportion to the ratio of the area of each candidate segment box that overlaps the previously selected associated segment box to the entire area of each candidate segment box. That is, the higher the ratio, the higher the third score that may be assigned.

The score calculation unit 920 may sum the first to third scores SCORE1, SCORE2 and SCORE3 assigned to each candidate segment box to calculate a final score TSCORE.

The score comparison unit 930 may select, among the candidate segment boxes, the candidate segment box having the highest final score TSCORE as an associated segment box at the current time t, and may output the selected associated segment box through the output terminal OUT1.

Figure 12:
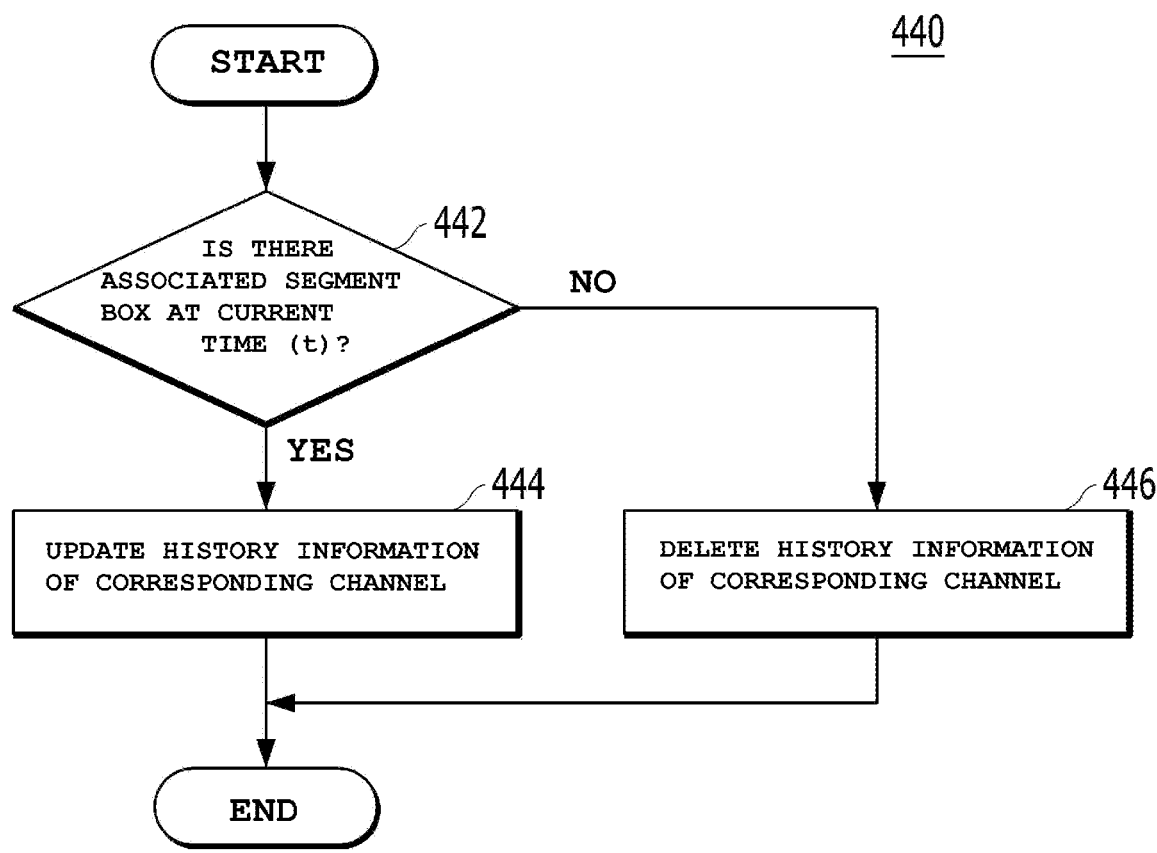
FIG. 12 is a flowchart for explaining an object-tracking method using a LiDAR sensor according to another embodiment.

FIG. 12 is a flowchart for explaining an object-tracking method 440 using the LiDAR sensor 500 according to another embodiment.

Step 400 shown in FIG. 1 may further include the object-tracking method 440 shown in FIG. 12.

First, it is determined whether there is an associated segment box at the current time t (step 442). Step 442 may be performed after step 430, or may be performed at step 420. If it is determined at step 420 that there is no candidate segment box, it may be determined that there is no associated segment box at the current time t. Alternatively, when an associated segment box at the current time t is selected at step 430, it may be determined that there is an associated segment box at the current time t.

If there is an associated segment box, the history information of the $m^{th}$ channel to which the associated segment box belongs may be updated (step 444). For example, the final selection unit 648 may output information on the associated segment box at the current time t for the target object that is being tracked in the $m^{th}$ channel to the storage unit 642 through the output terminal OUT1 to update the history information of the $m^{th}$ channel.

However, when there is no associated segment box, the history information of the $m^{th}$ channel in which there is no associated segment box may be deleted (step 446). For example, when it is determined that none of the "N" segment boxes which belong to the $m^{th}$ channel is selected as a candidate segment box, the box selection unit 840 shown in FIG. 7 may output a deletion request signal to the storage unit 642 through an output terminal OUT3, and the storage unit 642 may delete the history information of the $m^{th}$ channel in response to the deletion request signal.

In addition, when it is determined that at least one of the "N" segment boxes which belong to the $m^{th}$ channel is a segment box associated with a new target object, the object-tracking unit 640 may store the information on the associated segment box for the new target object in an empty channel of the storage unit 642, if any. In this way, the object-tracking unit 640 may distinguish between the target object that is currently being tracked and the newly recognized target object, and may assign a new identification (ID) number to the new target object. When the target object that is being tracked disappears, the object-tracking unit 640 may retrieve the identification (ID) number assigned to the disappeared target object.

In addition, the object-tracking unit 640 shown in FIG. 2 may determine whether the target object is an obstacle, a vehicle, or a person using the information on the associated segment box.

Referring to FIG. 2, for example, when the object-tracking method and device 600 described above are used in the vehicle 1000, the vehicle 1000 may further include a vehicle device 700. The vehicle device 700 may control the vehicle 1000 based on the information on the target object tracked by the object-tracking unit 640 and the type of target object.

The vehicle device 700 may control the vehicle 1000 based on the determined information on an object, received from the object-tracking device 600. For example, the vehicle device 700 may include a lane-keeping assist system for preventing a vehicle from deviating from a lane while maintaining the distance to a preceding vehicle, an obstacle detection system for detecting obstacles present around a vehicle, a collision prevention system for detecting the risk of a collision, an autonomous driving system for controlling a vehicle to travel autonomously while detecting obstacles present ahead of the vehicle, and a safe driving system for warning of the approach of another vehicle adjacent to the host vehicle and for controlling the host vehicle to assist in safe driving of the host vehicle.

The LiDAR sensor 500 may be located at at least one of the front side, lateral sides, or rear side of the vehicle 1000. The object-tracking method and device 600 and the vehicle 1000 including the same according to the embodiments are not limited as to the specific position at which the LiDAR sensor 500 is mounted in the vehicle 1000.

A recording medium in which a program for executing the method of tracking an object using the LiDAR sensor 500 is recorded may store a program for implementing a clustering function of grouping LiDAR data composed of a plurality of points for an object obtained by the LiDAR sensor 500, a function of generating information on a plurality of segment boxes for each channel using the result of clustering, and a function of selecting, among the plurality of segment boxes, an associated segment box at the current time t for the target object that is being tracked. The function of selecting an associated segment box at the current time t may include a function of calculating a correlation index between the current representative point and each of the tracking representative point and the previous representative point of each of the plurality of segment boxes at the current time t, a function of selecting, among the plurality of segment boxes, candidates for an associated segment box using the correlation index, and a function of selecting, among the selected candidates, an associated segment box at the current time t. The recording medium may be read by a computer system.

The computer-readable recording medium includes all kinds of recording devices in which data that may be read by a computer system are stored. Examples of the computer-readable recording medium include a Read-Only Memory (ROM), a Random Access Memory (RAM), a Compact Disk ROM (CD-ROM), a magnetic tape, a floppy disc, and an optical data storage. The computer-readable recording medium can also be distributed over network-connected computer systems so that the computer-readable code is stored and executed in a distributed fashion. Also, functional programs, code, and code segments for accomplishing the object-tracking method can be easily construed by programmers skilled in the art to which the present disclosure pertains.

Hereinafter, an object-tacking method according to a comparative example and the object-tracking method according to the embodiment will be described with reference to the accompanying drawings.

In first and second comparative examples, in which "association" is performed, it may be determined whether there is a correlation between a predicted tracking box and a plurality of segment boxes of a target object that is being tracked, and information on the segment box having a correlation may be selected. For example, the presence or absence of the correlation is determined through comparison between the points of boxes. The correlation between the tracking box and the segment box may be determined using an Euclidean distance or a Mahalanobis distance. When the determined distance satisfies an allowable boundary value, it may be determined that there is a correlation.

In the case of the first comparative example, the center of the segment box is used as a representative point. In this case, since the information on the segment box does not accurately indicate the heading of the segment box, the first comparative example is robust to heading error. However, due to the characteristics of the LiDAR sensor 500, when the size of the segment box changes due to determining the visibility and the shape of the object, the changed size of the segment box may be reflected in the error.

Figure 13A:
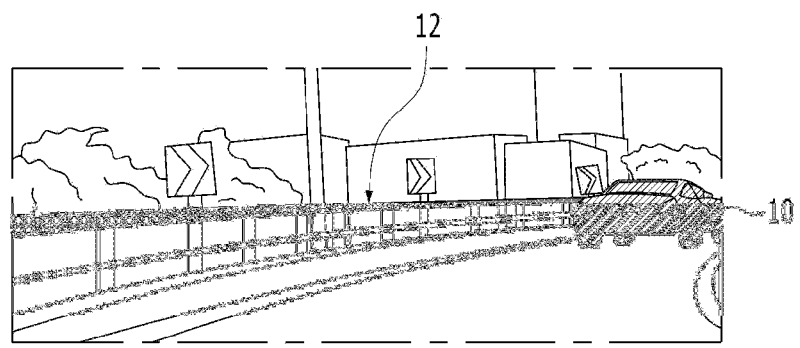
FIG. 13A is a diagram showing a target object and a guardrail that are being tracked using a LiDAR sensor.
Figure 13B:
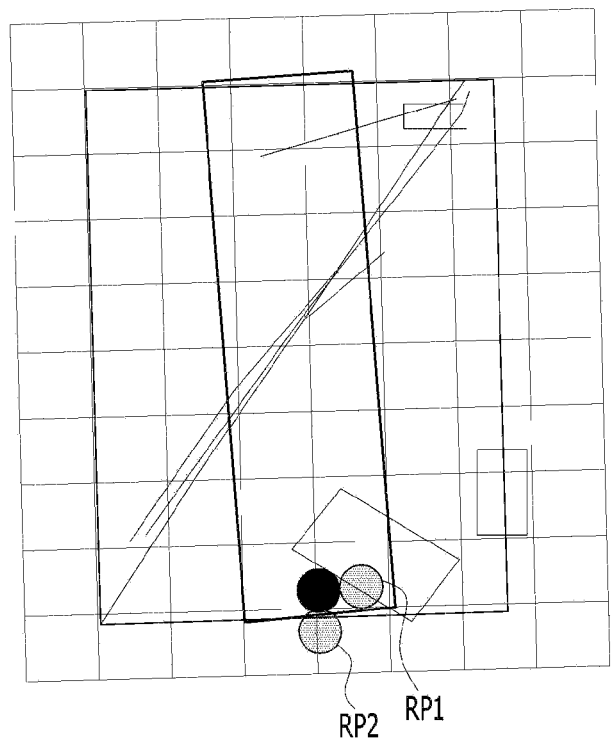
FIG. 13B is a diagram for explaining the process of tracking the target object according to a second comparative example.

FIG. 13A is a diagram showing a target object 10 and a guardrail 12 that are being tracked using the LiDAR sensor 500, and FIG. 13B is a diagram for explaining the process of tracking the target object 10 according to the second comparative example.

Figures 14A, 14B, 14C:
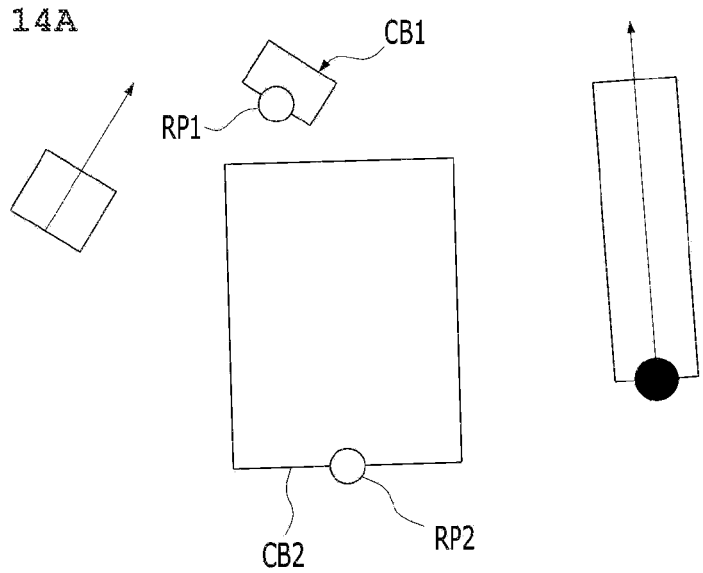
FIGS. 14A to 14C are diagrams for explaining the second comparative example.

FIG. 14A is a diagram of a tracking box, in which an arrow indicates the heading direction thereof, FIG. 14B is a diagram showing two exemplary candidate segment boxes CB1 and CB2 selected by the second comparative example, and FIG. 14C is a diagram showing a segment box estimated using history information updated using an associated segment box incorrectly selected by the second comparative example.

In the case of the second comparative example, the center of the rear side of the segment box is used as a representative point. For example, according to the second comparative example, the centers of the rear sides of the candidate segment boxes CB1 and CB2 for association are used as representative points RP1 and RP2. Since the density of the point cloud is high at the center of the rear side of the segment box with respect to the mounting position of the LiDAR sensor 500, the second comparative example is robust to a change in the size of the segment box according to the shape of a target object, thereby stably providing the position of the measured value in the longitudinal direction. However, since the second comparative example is incapable of accurately recognizing the heading when generating information on the segment box, there is a problem in that the reference of the rear side is changed (e.g. a problem in that the width of the segment box and the length thereof are switched to each other), thus incurring a large error in the position of the measured value. In this way, according to the second comparative example, in which "association" is performed on the basis of the rear side of the segment box, when the correlation is determined using the distance, tracking loss may occur due to incorrect association.

In the curved section shown in FIG. 13A, the guardrail 12 having a curved shape is recognized as a large segment box CB2. However, this segment box CB2 is not a segment box which is substantially necessary in order to maintain tracking of the target object 10 that is being tracked. Nevertheless, if the unnecessary segment box CB2 is selected as an associated segment box and history information is updated using the same, it can be seen from FIG. 14C that, when a tracking box is predicted based on the updated history information, the heading indicated by the arrow is not aligned with the actual heading of the target object 10.

Figure 15:
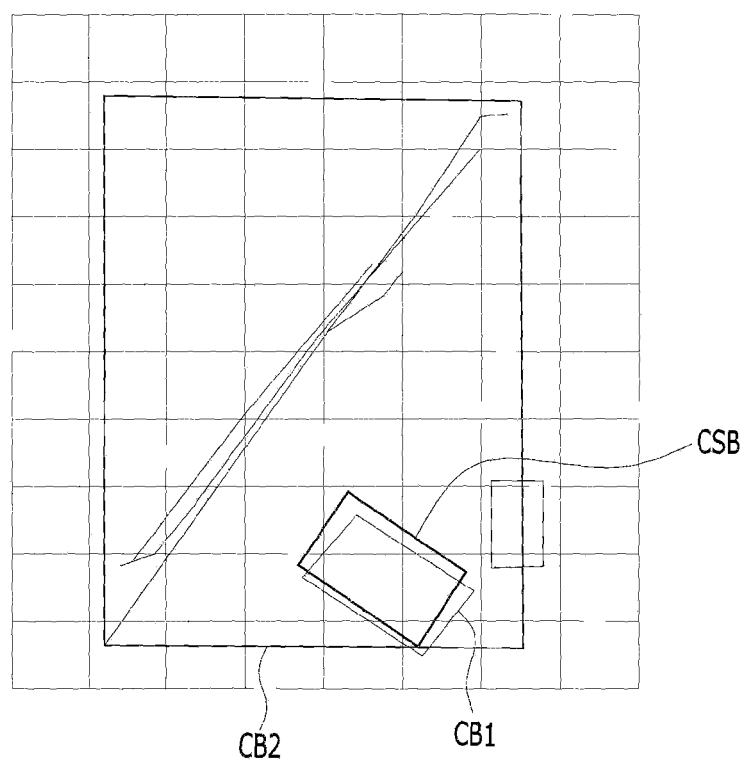
FIG. 15 is a diagram showing the result of tracking when association is performed by the object-tracking method and device according to the embodiment.

FIG. 15 is a diagram showing the result of tracking when "association" is performed by the object-tracking method and device according to the embodiment.

According to the embodiment, among the plurality of segment boxes CB1 and CB2, the optimal associated segment box CB1, which matches the target object 10 that is being tracked, is selected, and the history information of the target object 10 is updated using the same. In this case, it can be seen from FIG. 15 that, when the tracking box CSB of the target object 10 is generated using the updated history information, it is possible to minimize errors in the heading, position, and shape of the target object 10. In particular, according to the embodiment, a candidate segment box is primarily selected using a factor related to distance. At this time, whether a segment box that has not been primarily selected as a candidate segment box overlaps the tracking box TB, i.e. is in surface contact with the tracking box TB, is determined in order to secondarily select a candidate segment box. Thus, it is possible to prevent an associated segment box from being incorrectly selected due to selection of a candidate segment box using only the distance factor.

As is apparent from the above description, a method and device for tracking an object using a LiDAR sensor, a vehicle including the device, and a recording medium storing a program to execute the method according to embodiments are capable of tracking a target object using a LiDAR sensor without errors or with minimized errors.

However, the effects achievable through the disclosure are not limited to the above-mentioned effect, and other effects not mentioned herein will be clearly understood by those skilled in the art from the above description.

The above-described various embodiments may be combined with each other without departing from the objects of the present disclosure unless they are incompatible with each other. In addition, for any element that is not described in detail in any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of tracking an object using a LiDAR sensor, the method comprising:
   selecting, among a plurality of segment boxes for each channel obtained by using a plurality of points for an object obtained by the LiDAR sensor, an associated segment box at a current time for a target object that is being tracked, wherein the selecting comprises:
      obtaining a correlation index between a current representative point and each of a tracking representative point and a previous representative point of each of the plurality of segment boxes at the current time;
      selecting, among the plurality of segment boxes, candidate segment boxes for the associated segment box using the correlation index; and
      selecting, among the selected candidate segment boxes, the associated segment box at the current time,
   wherein the tracking representative point corresponds to a representative point of a tracking box of the target object at the current time, estimated using history information, and
   wherein the previous representative point corresponds to a representative point of a segment box selected as the associated segment box at a previous time.

2. The method according to claim 1, wherein:
the current representative point comprises:
- a first peripheral representative point located at a corner of the segment box; and
- a first central representative point located at a center of the segment box;

the tracking representative point comprises:
- a second peripheral representative point located at a corner of the tracking box; and
- a second central representative point located at a center of the tracking box; and the previous representative point comprises a third peripheral representative point located at a periphery of the associated segment box selected at the previous time.

3. The method according to claim 2, wherein the correlation index comprises:
- a first correlation index between the first peripheral representative point and the second peripheral representative point;
- a second correlation index between the first central representative point and the second central representative point; and
- a third correlation index between the first peripheral representative point and the third peripheral representative point.

4. The method according to claim 3, wherein the first, second and third correlation indices are obtained using the LiDAR sensor as follows:

$$\gamma_1 = \frac{(x_{mo} - x_o)^2}{(\sigma^2_{xm} + \sigma^2_x)} + \frac{(y_{mo} - y_o)^2}{(\sigma^2_{ym} + \sigma^2_y)}$$

$$\gamma_2 = \frac{(x_{mc} - x_c)^2}{(\sigma^2_{xmc} + \sigma^2_x)} + \frac{(y_{mc} - y_c)^2}{(\sigma^2_{ymc} + \sigma^2_y)}$$

$$\gamma_3 = \frac{(x^t_{mo} - x^{t-1}_{mo})^2}{(\sigma^2_{xm} + \sigma^2_K)} + \frac{(y^t_{mo} - y^{t-1}_{mo})^2}{(\sigma^2_{ym} + \sigma^2_y)}$$

where $\gamma_1$ represents the first correlation index, $\gamma_2$ represents the second correlation index, $\gamma_3$ represents the third correlation index, each of $X_{m0}$ and $x^t_{m0}$ represents a horizontal-axis coordinate of the first peripheral representative point, each of $y_{m0}$ and $y^t_{m0}$ represents a vertical-axis coordinate of the first peripheral representative point, $x_0$ represents a horizontal-axis coordinate of the second peripheral representative point, $y_0$ represents a vertical-axis coordinate of the second peripheral representative point, $\sigma^2_{xm}$ represents a horizontal-axis variance value of the first peripheral representative point, $\sigma^2_{ym}$ represents a vertical-axis variance value of the first peripheral representative point, $\sigma^2_x$ represents a horizontal-axis variance value of the second peripheral representative point, $\sigma^2_y$ represents a vertical-axis variance value of the second peripheral representative point, $X_{mc}$ represents a horizontal-axis coordinate of the first central representative point, $y_{mc}$ represents a vertical-axis coordinate of the first central representative point, $\sigma^2_{xmc}$ represents a horizontal-axis variance value of the first central representative point, $\sigma^2_{ymc}$ represents a vertical-axis variance value of the first central representative point, $x_c$ represents a horizontal-axis coordinate of the second central representative point, $y_c$ represents a vertical-axis coordinate of the second central representative point, $x^{t-1}_{m0}$ represents a horizontal-axis coordinate of the third peripheral representative point, $y^{t-1}_{m0}$ represents a vertical-axis coordinate of the third peripheral representative point, t represents the current time, and t−1 represents the previous time.

5. The method according to claim 4, wherein, in selecting the candidate segment boxes, one of the plurality of segment boxes that satisfies at least one of three conditions below is selected as the candidate segment box for the associated segment box:

$\gamma_1 <$ C1

$\gamma_2 <$ C2

$\gamma_3 <$ C3 where C1, C2 and C3 represent preset critical indices.

6. The method according to claim 5, wherein one of the plurality of segment boxes that does not satisfy the three conditions but overlaps the tracking box is selected as the candidate segment box.

7. The method according to claim 4, wherein selecting the associated segment box comprises:
- assigning a first score to a distance suitability of each of the candidate segment boxes;
- assigning a second score to a reliability suitability of each of the candidate segment boxes;
- assigning a third score to a correlation between each of the candidate segment boxes and the associated segment box selected at the previous time;
- summing the first to third scores assigned to each of the candidate segment boxes to calculate a final score; and
- selecting, among the candidate segment boxes, a candidate segment box that has a highest final score as the associated segment box at the current time.

8. The method according to claim 7, wherein, in assigning the first score, the first score is assigned to one of the candidate segment boxes in which a smallest one of the first to third correlation indices is equal to or less than a first threshold value.

9. The method according to claim 8, wherein assigning the second score comprises:
- obtaining a reliability level of each of the candidate segment boxes; and
- assigning the second score to one of the candidate segment boxes that has a reliability level greater than a second threshold value.

10. The method according to claim 9, wherein obtaining the reliability level comprises:
- a shape reliability level determination step of obtaining a $2\text{-}1^{st}$ reliability level corresponding to a shape of the candidate segment box;
- an attribute reliability level determination step of obtaining a $2\text{-}2^{nd}$ reliability level corresponding to at least one of a ratio of a number of points included in the candidate segment box to a size of the candidate segment box or a degree of dispersion of points included in the candidate segment box;
- a geometric reliability level determination step of obtaining a $2\text{-}3^{rd}$ reliability level corresponding to a position of the candidate segment box and a distance from a reference point to the candidate segment box; and
- summing the $2\text{-}1^{st}$, $2\text{-}2^{nd}$, and $2\text{-}3^{rd}$ reliability levels to determine the reliability level to be compared with the second threshold value.

11. The method according to claim 9, wherein, in assigning the third score, the third score is assigned in proportion to a ratio of an area of each candidate segment box that overlaps the associated segment box selected at the previous time to an entire area of each candidate segment box.

12. The method according to claim 1, further comprising:
   determining whether the associated segment box selected at the current time is present;
   upon determining that the associated segment box is present, updating the history information of a channel to which the associated segment box belongs; and
   upon determining that the associated segment box is not present, deleting the history information of a channel in which the associated segment box is not present.

13. A non-transitory computer-readable recording medium in which a program for executing a method of tracking an object using a LiDAR sensor is recorded, the recording medium storing a program to implement:
   a function of selecting, among a plurality of segment boxes for each channel obtained by using a plurality of points for an object obtained by the LiDAR sensor, an associated segment box at a current time for a target object that is being tracked, wherein the function of selecting comprises:
   a function of calculating a correlation index between a current representative point and each of a tracking representative point and a previous representative point of each of the plurality of segment boxes at the current time;
   a function of selecting, among the plurality of segment boxes, candidates for the associated segment box using the correlation index; and
   a function of selecting, among the selected candidates, the associated segment box at the current time,
   wherein the tracking representative point corresponds to a representative point of a tracking box of the target object at the current time, estimated using history information, and
   wherein the previous representative point corresponds to a representative point of a segment box selected as the associated segment box at a previous time.

* * * * *

UNITED STATES PATENT AND TRADEMARK OFFICE
CERTIFICATE OF CORRECTION

PATENT NO. : 12,253,602 B2  
APPLICATION NO. : 17/180243  
DATED : March 18, 2025  
INVENTOR(S) : Hyun Ju Kim Page 1 of 1

It is certified that error appears in the above-identified patent and that said Letters Patent is hereby corrected as shown below:

In the Claims

In Column 21, in Claim 4, Line 32, delete "$(x_{mo}-x_o)^{2}$" and insert -- $(x_{m0}-x_0)^2$ --.

In Column 21, in Claim 4, Line 32, delete "$(y_{mo}-y_o)^{2}$" and insert -- $(y_{m0}-y_0)^2$ --.

In Column 21, in Claim 4, Line 37, delete "$(x^t_{mo}-x^{t-1}_{mo})^{2}$" and insert -- $(x^t_{m0}-x^{t-1}_{m0})^2$ --.

In Column 21, in Claim 4, Line 37, delete "$(y^t_{mo}-y^{t-1}_{mo})^{2}$" and insert -- $(y^t_{m0}-y^{t-1}_{m0})^2$ --.

In Column 21, in Claim 4, Line 38, delete "$(\sigma^2_{xm}+\sigma^2_{K})$" and insert -- $(\sigma^2_{xm}+\sigma^2_{x})$ --.

Signed and Sealed this  
Twenty-ninth Day of April, 2025

Coke Morgan Stewart  
*Acting Director of the United States Patent and Trademark Office*